United States Patent Office 3,754,012
Patented Aug. 21, 1973

3,754,012
PREPARATION OF METHYLTIN COMPOUNDS
Eric Jan Bulten, Bilthoven, the Netherlands, assignor to Cosan Chemical Corporation, Clifton, N.J.
No Drawing. Filed Jan. 6, 1972, Ser. No. 215,916
Claims priority, application Netherlands, Jan. 7, 1971, 7100202
Int. Cl. C07f 7/22
U.S. Cl. 260—429.7          12 Claims

ABSTRACT OF THE DISCLOSURE

Methyltin compounds having a structure represented by the formula $$(CH_3)_{4-n}SnX_n$$

in which X is a halogen and n is an integer from 0 to 3 are produced in high yield by a process in which a stannic halide is transmethylated with tetramethyllead at a temperature below about 90° C., following which the reaction product is heated to a temperature above about 100° C. for a period of time sufficient to produce the desired methyltin compound by exhaustive transmethylation. These methyltin compounds and their derivatives (such as methyltin oxides) are important for the preparation of many biocides, polymer stabilizers, glass strengthening agents and catalysts.

BACKGROUND OF THE INVENTION

A number of procedures for the preparation of alkyltin compounds are known. One of the known methods involves the reaction of a stannic halide with an appropriate Grignard reagent. If an excess of Grignard reagent is used, a tetramethyltin will be the primary product; however, stoichiometric or less amounts of Grignard reagent will yield two or more of the various alkyltin halides depending upon the reaction conditions employed. Alternatively, a stannic halide may be reacted with aluminium, sodium or lithiumalkyls to form alkyltin halides. A third process of limited value is the direct reaction of an alkyl halide with metallic tin, preferably conducted in the presence of metallic copper or zinc. None of these procedures has been found to be commercially feasible.

Recently, consideration has been given to the possibility of the use of tetramethyllead as a methylating agent in various processes. One process I considered was the methylation of stannic halides with tetramethyllead to form methyltin compounds. The simple mixture of a stannic halide, particularly stannic chloride, with tetramethyllead without temperature control results in a violently exothermic reaction. The reaction product of this reaction is a solid containing unpredictable proportion of various methyltin compounds. Due to the violence of the exothermic reaction and the unpredictability of the product distribution, the simple mixing of a stannic halide and tetramethyllead is an impractical and dangerous route for the synthesis of methyltin compounds.

OUTLINE OF THE INVENTION

It has now been discovered that by application of certain temperature controls to the reaction between a stannic halide and tetramethyllead, a safe, relatively simple, economically practicable commercial synthesis of methyltin compounds is available using a stannic halide and tetramethyllead as the reactants. This invention thus provides a commercial process for the preparation of methyltin compounds by the transmethylation of a stannic halide with tetramethyllead. More particularly, the invention relates to the preparation of methyltin compounds of the formula $(CH_3)_{4-n}SnX_n$, in which X is a halogen and n is an integer of from 0 to 3, by the transmethylation of a stannic halide with tetramethyllead at less than about 90° C., followed by the heating of the transmethylation reaction product to above 100° C. for a time sufficient to produce by exhaustive transmethylation a product containing a major amount of a single methyltin compound. As indicated, the final reaction product will contain at least a major portion, i.e., more than 50% by weight, based upon the amount of $SnX_4$ reactant converted, and preferably more than 75% by weight, of a single methyltin compound. Additionally, the process of this invention provides for high conversion of $SnX_4$ to the methyltin compounds; in many cases almost quantitative conversions to methyltin compounds are recoverable. Recoverable amounts of lead halides are also formed during the process of this invention.

The transmethylation of stannic halides by tetramethyllead by the process of this invention is believed to occur by the following reactions:

(1) $(CH_3)_4Pb + 3SnX_4 \rightarrow 3CH_3SnX_3 + CH_3X + PbX_2$ (2) $2(CH_3)_4Pb + 3SnX_4 \rightarrow 3(CH_3)_2SnX_2 + 2CH_3X + 2PbX_2$ (3) $(CH_3)_4Pb + SnX_4 \rightarrow (CH_3)_3SnX + CH_3X + PbX_2$ (4) $2(CH_3)_4Pb + SnX_4 \rightarrow (CH_3)_4Sn + 2(CH_3)_2PbX_2$ The process of this invention actually provides major portions of these specific products by utilizing molar ratios of reactants roughly approximating the theoretical of these equations and the described temperature controls and the after-heating step. Thus the process of this invention provides a high conversion of $SnX_4$ to methyltin compounds with a high yield of a particular methyltin compound.

BASIC PARAMETERS OF THE INVENTION

The transmethylation reaction of this invention must be conducted at controlled temperatures below the boiling point of the tetramethyllead reactant (i.e. about 110° C.). The reduced temperature must be maintained below about 90° C. to provide the optimal methyl transfer provided by the process of this invention. Preferably, the temperature of the methylation step should be below about 40° C., e.g. about 15° C. to 35° C., and may even be carried out at below 0° C.

The transmethylation reaction may be conducted in the presence or absence of an inert organic solvent. If the transmethylation is carried out in the absence of a solvent, a solid reaction product normally results. When an inert organic solvent is utilized, the product of the transmethylation may be either a solid-solvent slurry or a solution depending upon the solubility characteristics of the products in the particular solvent utilized.

"Inert" organic solvents contemplate only those organic solvents which do not interfere with the transmethylation reaction by reaction or complex formation with either reactant. The presence of a solvent also is helpful in achieving the required temperature control during the transmethylation stage. Among the solvents found to be useful in this invention are aliphatic, cycloaliphatic and aromatic hydrocarbons such as hexane, petroleum ether fractions, benzene or xylenes; chlorinated hydrocarbons such as chloroform, methylene chloride, or chlorobenzene and lowe aliphatic alcohols such as ethanol, propanol or butanol.

The temperature control of the transmethylation should normally be continued while the exothermic nature of the reaction persists. Normally, the transmethylation should therefore be continued under controlled temperature conditions for at least about one-half hour and preferably from 1 to about 10 hours. The actual reaction temperature, however, is a primary factor in the determination of the duration of the transmethylation reaction. Additionally, sub or superatmospheric pressure may be employed, although atmospheric pressure is advantageously used. The pressure and temperature at which the reaction is maintained, therefore, affect the duration of the transmethylation reaction.

The molar ratio of stannic halide to tetramethyllead in the transmethylation reaction should be between about 0.2 to 10:1 in order to provide a major portion of a single methyltin compound as the final product.

After the initial transmethylation reaction has been completed, the solvent, if present, may be removed, for example by distillation, prior to the after-heating of the transmethylation product. Additionally, if a solvent is utilized in the transmethylation stage, the $PbX_2$ product will normally be insoluble therein. The $PbX_2$ product can, therefore, normally be recovered prior to the after-heating stage when a solvent is utilized. The solvent, however, need not be removed prior to the after-heating stage. The volatile methyl halide product may also be recovered as it is accumulated during the transmethylation.

The after-heating of the transmethylation product is conducted at a temperature above about 100° C. but normally not above about 200° C. The upper limit of practicable temperature for the after-heating is, however, in actuality only determined by the temperature at which degradation of the methyltin products occurs. It is preferred, however, to carry out the after-heating treatment at about 125 to 164° C., advantageously in a two-step sequence, first at about 125 to 135° C. and then about 145 to 165° C. Again, sub or superatmospheric pressure might be utilized, but no particular advantage arises therefrom.

The after-heating treatment should advantageously be carried out in a moisture-free environment. A moisture-free environment is desirable since the methyltin halide products react with water at these temperatures to form methyltin hydroxides with the liberation of undesirable gaseous hydrogen halides.

The duration of the after-heating step may vary considerably. The duration of the after-heating stage may vary from about one hour to ten hours under normal circumstances. However, periods of as little as a few minutes might be sufficient under certain circumstances.

It has been found that the after-heating stage proceeds more successfully if carried out in the absence of a solvent.

If a solvent is utilized in the initial transmethylation reaction which occurs below about 90° C., then the solvent should be sufficiently volatile to be easily removable prior to the after-heating.

Upon completion of the after-heating procedure, the methyltin compounds are normally recovered by the separation thereof from any other remaining by-products such as lead halides or dimethyllead halides. The separation can be accomplished, for example, by simple distillation procedures or solvent extraction methods. By using the proper molar ratio of stannic halide and tetramethyllead (as shown in the applicable foregoing equations) and by following both the temperature-controlled mixing of the reactants below about 90° C. and after-heating of the reaction product above about 100° C., it is possible to produce the desired methyltin compound in exceptionally high yields. By way of illustration, trimethyltin chloride may be produced in almost quantitative yields using equimolar amounts of stannic halide and tetramethyllead as shown in Equation 3.

Methyltin compounds produced in accordance with this invention are widely recognized as being useful as biocides, particularly insecticides, stabilizers for polymers such as PVC resins, catalysts for polymerization such as olefin polymerization, glass strengthening aids, and as chemical intermediates for the preparation of dimethyltin oxide, which in turn is a useful intermediate in the preparation of silicone and urethane curing catalysts. More particularly, $(CH_3)_3SnX$ is useful as an intermediate in the preparation of $(CH_3)_6Sn_2$, a known insecticide. Compounds of the formula $(CH_3)_2SnX_2$ have been used to strengthen glass by decomposing them at relatively high temperatures upon glass surfaces. The decomposition products fill any cracks or scratches in the glass surface, thereby strengthening the glass. Also compounds of the formula $(CH_3)_2SnX_2$ can be reacted with caustic solutions to form dimethyltin oxide.

SPECIFIC EXAMPLES

The following specific examples represent non-limitative, preferred embodiments of this invention. Although stannic chloride and stannic bromide are the only stannic halides specifically exemplified, all the stannic halides, i.e. fluoride, chloride, bromide and iodine are contemplated as being basis of the amount of $SnX_4$ reactant present in the initial reaction medium, unless otherwise indicated.

Example I 5.2 grams of $SnCl_4$ (0.02 mole) were slowly added to 0.04 mole of $(CH_3)_4Pb$ (9.0 cc. of a 75% by weight solution in toluene) at ambient temperature with constant stirring accompanied by external cooling. The mixture was kept at ambient temperature for 4 hours and then heated for 3 hours at 130 to 140° C. Direct distillation from the vessel yielded 85% of $(CH_3)_4Sn$. Another 5% of $(CH_3)_4Sn$ was obtained by extraction of the solid residue with diethyl ether. Total yield of $(CH_3)_4Sn$ was 90%.

Example II 5.2 grams (0.02 mole) of $SnCl_4$ were added drop-wise to 0.02 mole $(CH_3)_4Pb$ (4.3 cc. of an 80% by weight solution of $(CH_3)_4Pb$ in toluene) while being stirred. The mixture was held at ambient temperature by external cooling. After stirring for 2 hours at ambient temperature, the solid reaction mass was heated for 5 hours at 100° C. After extraction with diethyl ether, $(CH_3)_3SnCl$ was obtained in a yield of almost 100%.

Example III

When Example II was repeated with heating for 6 hours at 140° C. instead of for 5 hours at 100° C., then 88% of $(CH_3)_3SnCl$ and 10% of $(CH_3)_2SnCl_2$ were obtained.

Example IV

A solution of 5.2 grams (0.02 mole) of $SnCl_4$ in 20 cc. of ethanol were added drop-wise to a solution of 0.02 mole of $(CH_3)_4Pb$ (4.5 cc. of a 75% by weight solution in toluene) in 20 cc. of ethanol. Ambient temperature was maintained by external cooling. After stirring for 4 hours the alcohol was distilled off at atmospheric pressure and the solid residue was heated for 3 hours at 130 to 140° C. Upon extraction with diethyl ether 60% of $(CH_3)_3SnCl$ and 35% of $(CH_3)_2SnCl_2$ were obtained.

Example V 130.3 grams of $SnCl_4$ (0.5 mole) were added drop-wise with constant stiring to 0.33 mole of $(CH_3)_4Pb$ (70.3 cc. of an 80% by weight solution in toluene). A semi-solid mass was formed. After stirring for 2 hours at ambient temperature, the mixture was heated for 2 hours at 130° C. and then for 4 hours at 150 to 169° C. Extraction with diethyl ether yielded 103 grams (95%) of $(CH_3)_2SnCl$ (melting point about 110° C.). Recrystallization from a light petroleum fraction (boiling range 100 to 120° C.) yielded 83.1 grams (76%) of pure $(CH_3)_2SnCl_2$ (melting point 107 to 108° C.). From the mother liquor, another 4.5 grams (4%) of a mixture of $CH_3SnCl_3$ and of $(CH_3)_3SnCl$ was obtained.

Example VI

A solution of 78.4 grams (0.3 mole) of $SnCl_4$ in 200 cc. of ethanol was slowly added to 0.2 mole of $(CH_3)_4Pb$ (42.2 cc. of an 80% by weight solution in toluene) in 200 cc. of ethanol at minus 20° C. The clear solution obtained was stirred for 2 hours at ambient temperature. Then the alcohol was distilled off and the solid residue was heated for 2 hours at 130° C. and then for 4 hours at 150 to 160° C. By extraction with diethyl ether, 100% of $CH_3SnCl_2$ (melting point about 110° C.) was obtained. Recrystallization from petroleum ether (boiling range 100 to 120° C.) yielded 54 grams (83%) of pure $(CH_3)_2SnCl_2$ (melting point 107 to 108° C.) and 6.4 grams (10%) of a product with a melting range of 50 to 60° C.

Example VII

A solution of 0.01 mole $(CH_3)_4Pb$ (2.25 cc. of a 75% by weight solution in toluene) in 10 cc. of ethanol was slowly added at ambient temperature, to a solution of 15.6 grams (0.06 mole) of $SnCl_4$ in 60 cc. of ethanol. After stirring for 2 hours at ambient temperature the alcohol was distilled off and the residue was heated for 6 hours at 140° C. Extraction with diethyl ether yielded 48% of $(CH_3)SnCl_3$, 6% of $(CH_3)_2SnCl$ and 47% of $SnCl_4$.

Example VIII

A solution of 13.1 grams (0.03 mole) of $SnBr_4$ in 20 cc. of ethanol was slowly added to a solution of 0.02 mole of $(CH_3)_4Pb$ (4.5 cc. of a 75% by weight solution in toluene) in 20 cc. of ethanol. The mixture was kept at ambient temperature by external cooling. Following the description of Example VI, 87% of $(CH_3)_2SnBr_2$ and 13% of $(CH_3)_3SnBr$ were obtained.

Example IX

Following the procedure of Example III, 8.8 grams (0.02 mole) of $SnBr_4$ in 20 cc. of ethanol and 0.02 mole of $(CH_3)_4Pb$ (4.5 cm.$^3$ of a 75% by weight solution in toluene) were combined, 78% of $(CH_3)_3SnBr$ and 10% of $(CH_3)_2SnBr_2$ were obtained.

I claim:
1. A method for preparing methyltin compounds of the formula $(CH_3)_{4-n}SnX_n$, in which $n$ is an integer of 0 to 3 and X is a halogen, comprising (a) reacting a stannic halide of the formula $SnX_4$ with tetramethyllead at a temperature of less than about 90° C. to transmethylate the stannic halide, and then (b) after-heating the transmethylation reaction product to a temperature above about 100° C. to provide by exhaustive transfer of methyl groups a product containing at least a major portion, based upon the amount of $SnX_4$ converted, of a single methyltin compound corresponding to the above formula.

2. A method of claim 1 wherein X is chlorine or bromine.

3. A method of claim 1 wherein the transmethylation reaction is carried out in the presence of an inert organic solvent.

4. A method of claim 1 wherein the transmethylation reaction is carried out at less than about 40° C.

5. A method of claim 1 wherein the after-heating procedure is carried out in the absence of a solvent.

6. A method of claim 1 wherein the after-heating procedure is carried out at about 125 to 165° C.

7. A method of claim 1 wherein the molar ratio of stannic halide to tetramethyllead is from about 0.2 to 10:1.

8. The process of claim 7 wherein the product contains at least about 75% by weight, based upon the $SnX_4$ converted, of a single methyltin compound.

9. The process of claim 8 wherein the single methyltin compound is $CH_3SnX_3$.

10. The process of claim 8 wherein the single methyltin compound is $(CH_3)_2SnX_2$.

11. The process of claim 8 wherein the single methyltin compound is $(CH_3)_3SnX$.

12. The process of claim 8 wherein the single methyltin compound is $(CH_3)_4Sn$.

References Cited
UNITED STATES PATENTS

| | | | |
|---|---|---|---|
| 3,151,142 | 9/1964 | Arimoto | 260—437 R |
| 3,297,732 | 1/1967 | Banks | 260—429.7 |
| 3,454,610 | 7/1969 | Langer | 260—429.7 |
| 2,390,988 | 12/1945 | Calingaert et al. | 196—44 |
| 2,453,138 | 11/1948 | Kharasch | 196—44 |

WERTEN F. W. BELLAMY, Primary Examiner

U.. Cl. X.R.

260—437 R

UNITED STATES PATENT OFFICE
CERTIFICATE OF CORRECTION

Patent No. 3,754,012           Dated August 21, 1973

Inventor(s) Eric Jan Bulten

It is certified that error appears in the above-identified patent and that said Letters Patent are hereby corrected as shown below:

Column 2, line 63, "and lowe" should read -- and lower --. Column 4, line 15, "iodine" should read -- iodide --; lines 16 and 17, should read -- as being useful in this invention. In these examples the yields are calculated on the basis of the amount of $SnX_4$ reactant present in the initial reaction medium, unless otherwise indicated. --; line 64, "of $(CH_3)_2SnCl$" should read -- of $(CH_3)_2SnCl_2$ --. Column 5, line 19, "of $(CH_3)_2SnCl$" should read -- of $(CH_3)_2SnCl_2$ --.

Signed and sealed this 29th day of January 1974.

(SEAL)
Attest:

EDWARD M. FLETCHER, JR.        RENE D. TEGTMEYER
Attesting Officer                 Acting Commissioner of Patents